(12) United States Patent
Walker et al.

(10) Patent No.: US 12,118,240 B2
(45) Date of Patent: Oct. 15, 2024

(54) CONTROLLER AND PERSISTENT MEMORY SHARED BETWEEN MULTIPLE STORAGE DEVICES

(71) Applicant: Intel Corporation, Santa Clara, CA (US)

(72) Inventors: Benjamin Walker, Chandler, AZ (US); Sanjeev Trika, Portland, OR (US); Kapil Karkra, Chandler, AZ (US); James R. Harris, Chandler, AZ (US); Steven C. Miller, Livermore, CA (US); Bishwajit Dutta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 755 days.

(21) Appl. No.: 16/987,748

(22) Filed: Aug. 7, 2020

(65) Prior Publication Data

US 2020/0363998 A1    Nov. 19, 2020

(51) Int. Cl.
*G06F 3/06* (2006.01)

(52) U.S. Cl.
CPC .......... *G06F 3/0659* (2013.01); *G06F 3/0619* (2013.01); *G06F 3/0656* (2013.01); *G06F 3/0658* (2013.01); *G06F 3/067* (2013.01); *G06F 3/0689* (2013.01)

(58) Field of Classification Search
None
See application file for complete search history.

(56) References Cited

U.S. PATENT DOCUMENTS

| 10,908,842 | B2 | 2/2021 | Oh et al. |
| 11,023,315 | B1 * | 6/2021 | Jadon ................... G06F 3/0619 |
| 2010/0169551 | A1 | 7/2010 | Yano et al. |
| 2012/0072652 | A1 | 3/2012 | Celis et al. |

(Continued)

FOREIGN PATENT DOCUMENTS

KR    20190135746    12/2019

OTHER PUBLICATIONS

Shterman, Roy, A Global FTL Architecture to Drive Multiple SSDs, Flash Memory Summit 2019 Santa Clara CA (Year: 2019).*

(Continued)

*Primary Examiner* — Arpan P. Savla
*Assistant Examiner* — Edmund H Kwong
(74) *Attorney, Agent, or Firm* — Essential Patents Group, LLP (57) ABSTRACT

An embodiment of an electronic apparatus may include one or more substrates, and logic coupled to the one or more substrates, the logic to maintain a respective lookup table for each of two or more persistent storage devices in a persistent memory outside of the two or more persistent storage devices with a first indirection granularity that is smaller than a second indirection granularity of each of the two or more persistent storage devices, buffer write requests to the two or more persistent storage devices in the persistent memory in accordance with the respective lookup tables, and perform a sequential write from the persistent memory to a particular device of the two or more persistent storage devices when a portion of the buffer that corresponds to the particular device has an amount of data to write that corresponds to the second indirection granularity. Other embodiments are disclosed and claimed.

20 Claims, 5 Drawing Sheets

(56) References Cited

U.S. PATENT DOCUMENTS

| | | | |
|---|---|---|---|
| 2014/0074804 A1 | 3/2014 | Colgrove et al. | |
| 2014/0108703 A1* | 4/2014 | Cohen | G06F 3/0634 |
| | | | 711/E12.008 |
| 2016/0378396 A1 | 12/2016 | Ramanujan et al. | |
| 2017/0235488 A1* | 8/2017 | Call | G06F 3/0679 |
| | | | 711/103 |
| 2017/0235681 A1* | 8/2017 | Kaburaki | G06F 12/0292 |
| | | | 711/128 |
| 2017/0286362 A1* | 10/2017 | Friedman | H04L 67/568 |
| 2019/0042146 A1* | 2/2019 | Wysoczanski | G06F 3/0679 |
| 2019/0079681 A1* | 3/2019 | Trika | G06F 3/0604 |
| 2019/0339904 A1* | 11/2019 | Myran | G06F 3/0688 |
| 2019/0369921 A1 | 12/2019 | Oh et al. | |
| 2020/0210080 A1* | 7/2020 | Palmer | G06F 3/0679 |
| 2020/0249980 A1 | 8/2020 | Dutta et al. | |
| 2020/0363998 A1 | 11/2020 | Walker et al. | |

OTHER PUBLICATIONS

International Preliminary Report on Patentability from PCT/US2021/040559 notified Feb. 16, 2023, 6 pgs.
International Search Report and Written Opinion from PCT/US2021/040559 notified Oct. 6, 2021, 10 pgs.

* cited by examiner

CONTROLLER AND PERSISTENT MEMORY SHARED BETWEEN MULTIPLE STORAGE DEVICES

BACKGROUND

Various electronic storage systems may involve multiple storage devices. For example, such systems include redundant array of independent disks (RAID) systems, erasure coding (EC) systems, just a bunch of disks (JBOD) systems, just a bunch of flash (JBOF) systems, etc. In some multi-device storage systems, one or more of the storage devices may include a solid state drive (SSD).

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 3A to 3C are flowcharts of an example of a method of controlling storage according to an embodiment;

DETAILED DESCRIPTION

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

Figure 1:
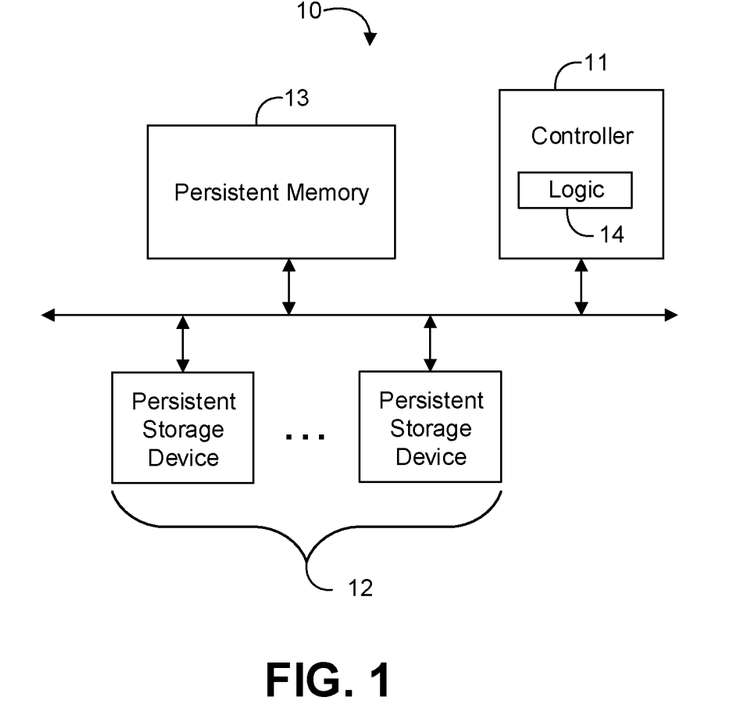
FIG. 1 is a block diagram of an example of an electronic system according to an embodiment.

With reference to FIG. 1, an embodiment of an electronic system 10 may include a controller 11 communicatively coupled to two or more persistent storage devices 12 and a persistent memory 13 outside of the two or more persistent storage devices 12. The controller 11 may include logic 14 to maintain a respective lookup table for each of the two or more persistent storage devices 12 in the persistent memory 13 with a first indirection granularity that is smaller than a second indirection granularity of each of the two or more persistent storage devices 12, buffer write requests to the two or more persistent storage devices 12 in the persistent memory 13 in accordance with the respective lookup tables, and perform a sequential write from the persistent memory 13 to a particular device of the two or more persistent storage devices 12 when a portion of the buffer that corresponds to the particular device has an amount of data to write that corresponds to the second indirection granularity. For example, the logic 14 may be configured to share the persistent memory 13 among the two or more persistent storage devices 12. In some embodiments, the logic 14 may be configured to provide a block interface to the two or more persistent storage devices 12.

In some embodiments, the logic 14 may be further to configure the two or more persistent storage devices 12 as a data protection volume with a stripe size that is the same as the second indirection granularity, and buffer the write requests to the two or more persistent storage devices 12 in the persistent memory 13 into full stripe writes in accordance with the respective lookup tables. For example, the logic 14 may be further configured to sequentially write full stripes from the persistent memory to the data protection volume. The logic 14 may also be configured to log the write requests in the persistent memory to close a write hole for the data protection volume. In some embodiments, the second indirection granularity may be an integer multiple of the first indirection granularity. For example, the first indirection granularity may be four kilobytes (4 KB) while the second indirection granularity may be sixty four kilobytes (64 KB), one hundred twenty eight kilobytes (128 KB), etc. In some embodiments, the data protection volume may comprise one of an erasure coding (EC) volume and a redundant array of independent disks (RAID) volume. In any of the embodiments herein, the persistent memory 13 may comprise 3D crosspoint memory and one or more of the two or more persistent storage devices 12 may comprise a NAND-based solid state drive (SSD).

Embodiments of each of the above controller 11, the two or more persistent storage devices 12, the persistent memory 13, the logic 14, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a memory controller, a storage controller, a micro-controller, a general purpose processor, a special purpose processor, a central processor unit (CPU), an execution unit, etc. In some embodiments, the persistent memory 13, the logic 14, and/or other system memory may be located in, or co-located with, various components, including the controller 11 (e.g., on a same die).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the persistent memory 13, other persistent memory, or other system memory may store a set of instructions which when executed by the controller 11 cause the system 10 to implement one or more components, features, or aspects of the system 10 (e.g., the logic 14, maintaining the lookup tables, buffering the write requests in the persistent memory 13, performing the sequential writes to the two or more persistent storage devices 12, etc.).

Figure 2:
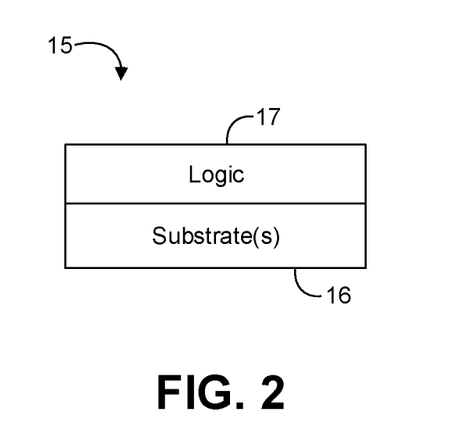
FIG. 2 is a block diagram of an example of an electronic apparatus according to an embodiment.

Turning now to FIG. 2, an embodiment of an electronic apparatus 15 may include one or more substrates 16, and logic 17 coupled to the one or more substrates 16. The logic 17 may be configured to maintain a respective lookup table for each of two or more persistent storage devices in a persistent memory outside of the two or more persistent storage devices with a first indirection granularity that is smaller than a second indirection granularity of each of the two or more persistent storage devices, buffer write requests to the two or more persistent storage devices in the persistent memory in accordance with the respective lookup tables, and perform a sequential write from the persistent memory to a particular device of the two or more persistent storage devices when a portion of the buffer that corresponds to the particular device has an amount of data to write that corresponds to the second indirection granularity. For example, the logic 17 may be configured to share the persistent memory among the two or more persistent storage devices. In some embodiments, the logic 17 may be configured to provide a block interface to the two or more persistent storage devices.

In some embodiments, the logic 17 may be further to configure the two or more persistent storage devices as a data protection volume with a stripe size that is the same as the second indirection granularity, and buffer the write requests to the two or more persistent storage devices in the persistent memory into full stripe writes in accordance with the respective lookup tables. For example, the logic 17 may be further configured to sequentially write full stripes from the persistent memory to the data protection volume. The logic 17 may also be configured to log the write requests in the persistent memory to close a write hole for the data protection volume. In some embodiments, the second indirection granularity may be an integer multiple of the first indirection granularity. In some embodiments, the data protection volume may comprise one of an EC volume and a RAID volume. In any of the embodiments herein, the persistent memory may comprise 3D crosspoint memory and one or more of the two or more persistent storage devices may comprise a NAND-based SSD.

Embodiments of the logic 17 may be implemented in a system, apparatus, computer, device, etc., for example, such as those described herein. More particularly, hardware implementations of the logic 17 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the logic 17 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the logic 17 may be implemented on a semiconductor apparatus, which may include the one or more substrates 16, with the logic 17 coupled to the one or more substrates 16. In some embodiments, the logic 17 may be at least partly implemented in one or more of configurable logic and fixed-functionality hardware logic on semiconductor substrate(s) (e.g., silicon, sapphire, gallium-arsenide, etc.). For example, the logic 17 may include a transistor array and/or other integrated circuit components coupled to the substrate(s) 16 with transistor channel regions that are positioned within the substrate(s) 16. The interface between the logic 17 and the substrate(s) 16 may not be an abrupt junction. The logic 17 may also be considered to include an epitaxial layer that is grown on an initial wafer of the substrate(s) 16.

Figure 3A:
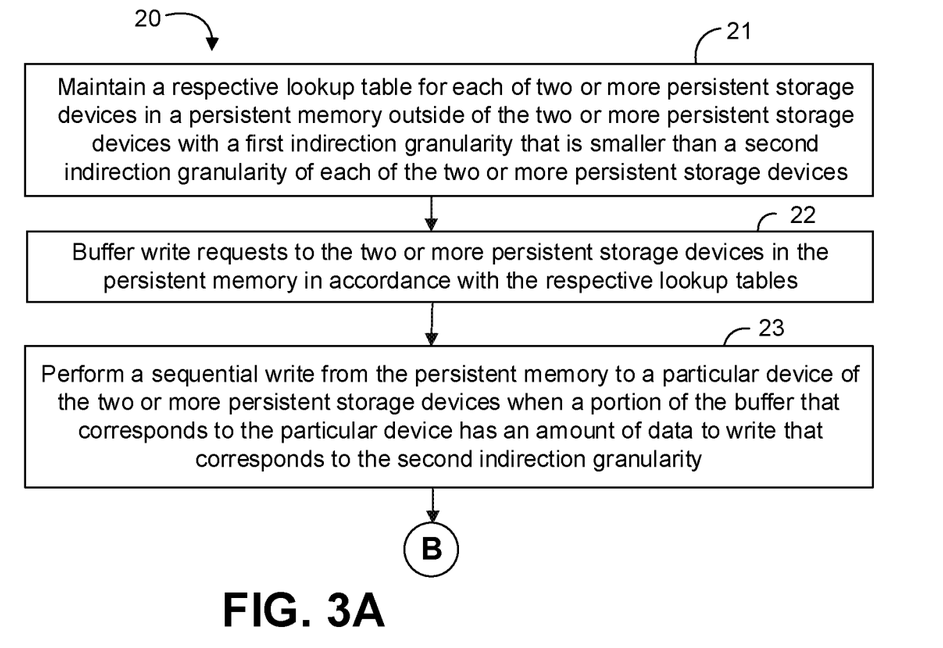
Figure 3B:
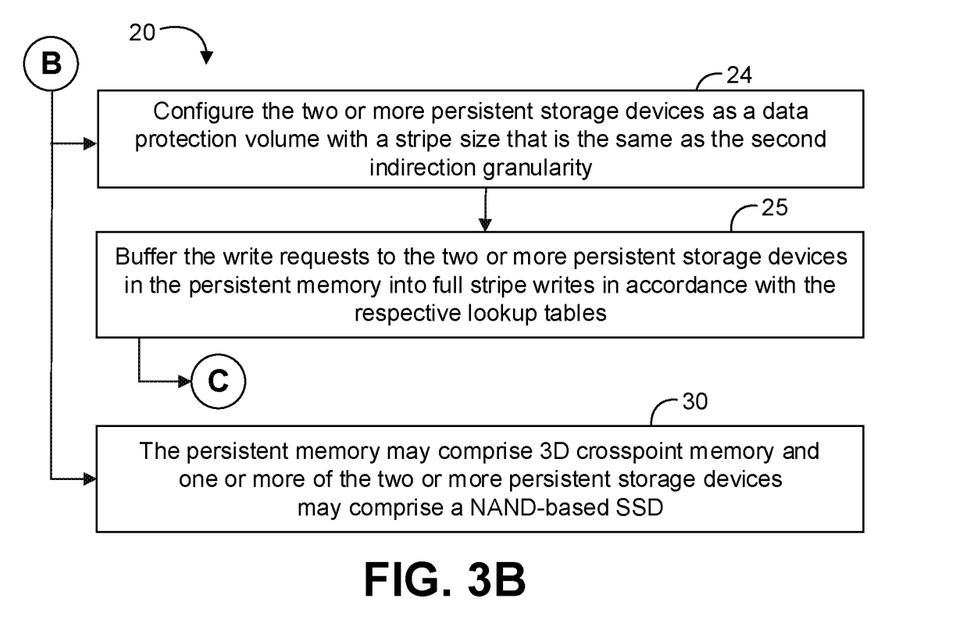
Figure 3C:
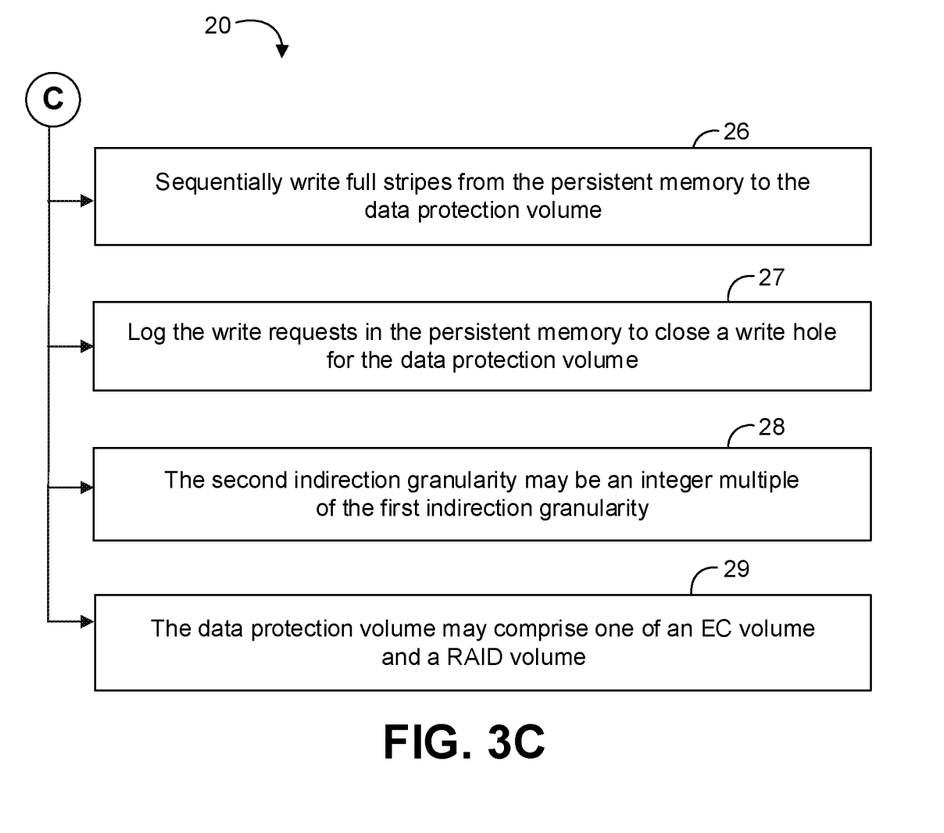

Turning now to FIGS. 3A to 3C, an embodiment of a method 20 of controlling storage may include maintaining a respective lookup table for each of two or more persistent storage devices in a persistent memory outside of the two or more persistent storage devices with a first indirection granularity that is smaller than a second indirection granularity of each of the two or more persistent storage devices at box 21, buffering write requests to the two or more persistent storage devices in the persistent memory in accordance with the respective lookup tables at box 22, and performing a sequential write from the persistent memory to a particular device of the two or more persistent storage devices when a portion of the buffer that corresponds to the particular device has an amount of data to write that corresponds to the second indirection granularity at box 23. For example, the method 20 may include sharing the persistent memory among the two or more persistent storage devices. In some embodiments, the method 20 may further include providing a block interface to the two or more persistent storage devices.

In some embodiments, the method 20 may further include configuring the two or more persistent storage devices as a data protection volume with a stripe size that is the same as the second indirection granularity at box 24, and buffering the write requests to the two or more persistent storage devices in the persistent memory into full stripe writes in accordance with the respective lookup tables at box 25. For example, the method 20 may further include sequentially writing full stripes from the persistent memory to the data protection volume at box 26, and/or logging the write requests in the persistent memory to close a write hole for the data protection volume at box 27. In some embodiments, the second indirection granularity may be an integer multiple of the first indirection granularity at box 28. In some embodiments, the data protection volume may comprise one of an EC volume and a RAID volume at box 29. In any of the embodiments herein, the persistent memory may comprise 3D crosspoint memory and one or more of the two or more persistent storage devices may comprise a NAND-based SSD at box 30.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 20 may be implemented on a computer readable medium. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology for combining 3D crosspoint memory (e.g., INTEL 3D XPOINT, INTEL OPTANE technology, etc.) and NAND-based storage (e.g., quad level cell (QLC) NAND) in a RAID/EC storage node to greatly reduce overall system cost while boosting performance and endurance. SSD RAM may be a significant contributor to Datacenter NAND SSD cost. Because flash must be written sequentially and wear-leveled, the SSD must maintain a persistent logical-to-physical (L2P) translation table. In most implementations, one entry exists in this table for a selected, typically 4 KB, granularity of accesses. As SSD density increases, the size and cost of the memory to maintain this L2P table becomes large. Some storage systems may use higher granularity indirection, or host memory for indirection. But both of these approaches have significant disadvantages related to random write performance, cost, and/or complexity. Furthermore, conventional technology may target a single SSD, while many storage nodes have multiple SSDs that may be configured as RAID or EC volumes. Some embodiments may provide technology to aggregate a set of QLC SSDs onto a server, add a higher level L2P table to the host in a shared 3D crosspoint memory, and write to the SSDs in much larger units, advantageously reducing the total cost of the storage volume.

Further, for JBOFs that provide redundancy through a mechanism like EC/RAID, some embodiments may stage various operations through the shared persistent memory to boost system performance and endurance while simultaneously and efficiently closing the EC write hole (ECWH) or the RAID write hole (RWH). In particular, some embodiments may provide a multi-level indirection system that performs write-sequentialization and RAID indirection and allows a high indirection-granularity SSDs to be used for the individual storage devices without sacrificing performance. As described in more detail below, some embodiments may further provide various advantageous combinations of technologies to deliver a cost effective and performant 3D crosspoint and QLC SSD storage node in an EC volume environment.

Typically, a system would be composed of some set of NAND SSDs plus potentially NVRAM all attached to a server. The SSDs typically consume 1 GB of internal memory per TB of capacity to maintain the L2P tables. The RAM on the SSDs must be power-fail safe and usable in an embedded product, so the cost is very high per gigabyte (e.g., far more costly than dual inline memory modules (DIMMs) that utilize 3D crosspoint technology). The RAID/EC controller on the system, which may be software on the server, may also use expensive NVDIMMs, or other high write amplification techniques, to close the write-hole. This further increases system cost significantly. Some SSDs may reduce the amount of NVRAM needed by utilizing high indirection granularity (e.g., 16 KB, 64 KB, etc.). Unfortunately, the higher indirection granularity may cause the SSD to suffer from poor 4 KB random write performance due to padding and read-modify-write operations, which is a high penalty to pay for a common workload.

Some SSDs may include technology to support 3D crosspoint memory inside the SSD enclosure to hold the L2P table. For a multi-device volume, this technology repeats the cost of a 3D crosspoint memory controller and media across each of the multiple SSDs in the storage nodes. Some open-channel systems may consume system DRAM (also expensive) to maintain the indirection tables, and furthermore also require complex power-loss recovery capacitance, expensive NVDIMMs, and logic. Some other storage environments may support indirection on top of indirected SSDs (e.g., key-value (KV) on block storage, file-systems on block-storage, a fully indirected RAID volume such as write-anywhere RAID on an SSD, etc.). However, none of these technologies reduce the storage cost, and some may not even provide a block interface. Moreover, none of these technologies provide a cost-effective way to close the RAID/EC write hole.

Some embodiments may provide technology to keep an additional 4 KB lookup table per SSD on a host server, stored in less expensive host-attached shared persistent memory (e.g., 3D crosspoint memory), and to buffer up multiple writes to only write to the each of the multiple SSDs in sequential units of 64 KB or more. For example, the SSD may be a self-contained SSD with 64 KB indirection unit granularity (e.g., a SSD with an asymmetric optimal read and write unit, such as a SSD that may be written to natively in 64 KB units and read from in 4 KB units). In some embodiments, the persistent memory may be further utilized to log writes for the RWH/ECWH technology. Advantageously, some embodiments may provide an overall reduced system cost, because 3D crosspoint memory is less expensive than conventional on-SSD powerfail safe memory and the persistent memory controller and persistent memory are shared across multiple SSDs. Some embodiments may advantageously further provide good random write performance, and RWH/ECWH closure.

Figure 4:
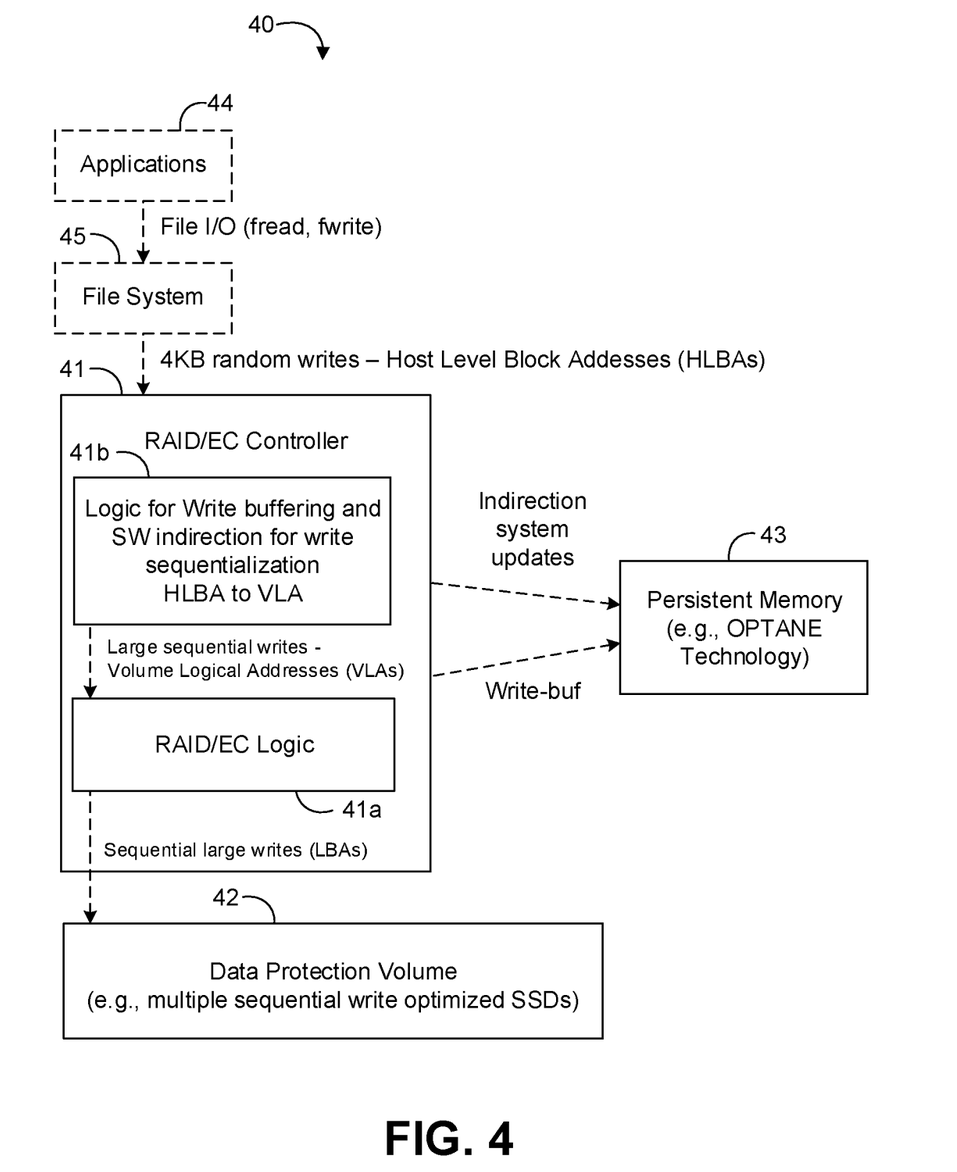
FIG. 4 is a block diagram of another example of an electronic system according to an embodiment.

With reference to FIG. 4, an embodiment of an electronic system 40 may include a RAID/EC controller 41 communicatively coupled to a data protection volume 42 (e.g., a storage volume which include multiple persistent storage devices such as sequential write optimized SSDs configured for data redundancy, data retention, data recovery, etc.) and persistent memory 43 (e.g., OPTANE DIMMs) outside of the data protection volume 42. The RAID/EC controller may include RAID/EC logic 41a and may be extended with additional logic 41b configured for write buffering and software (SW) indirection for write sequentialization. In this example, the indirection software may translate from a host level block address (HLBA) to a volume logical address (VLA).

FIG. 4 further illustrates an example write flow with dashed boxes and arrows. Applications 44 may request file input/output (I/O) by issuing file read (fread) and file write (fwrite) commands A file system 45 may process the file write commands and issue 4 KB random access writes with HLBAs. The logic 41b may process the random access writes from the file system 45 to translate the HLBAs to VLAs, buffer the writes in the persistent memory 43, and perform the indirection system updates. At a later time (e.g., when a full stripe is ready to be written), the logic 41b may initiate a large sequential write through the RAID/EC logic 41a. The RAID/EC logic 41a may translate the VLAs to logical block addresses (LBAs) for the data protection volume 42. Note that the respective persistent storage devices of the volume 42 may include their own indirection logic to translate the LBAs to physical addresses. In some embodiments, both levels of indirection may be implemented as lookup tables. Alternatively, translation from HLBA to VLBA may utilize a lookup table on the persistent memory 43, while the second indirection from VLBA to the actual disk LBAs may be purely algorithmic implemented in logic and not stored anywhere.

In an example implementation, the primary capacity of the data protection volume 42 may be comprised of SSDs that have an optimal write unit size (e.g., 64 KiB, 128 KiB, etc.) which is much larger than the 4 KiB indirection granularity of some other SSDs. The relatively high granularity reduces on-SSD RAM requirements substantially (e.g., by between about 16×, 32×, or more). The set of SSDs may be arranged as a JBOF/JBOD and may then be placed into a RAID/EC volume where the stripe size is equal to the relatively higher write granularity (e.g., 64 KiB, 128 KiB, etc.). In addition, one or more 4 KB lookup table(s) may be maintained in the persistent memory 43. The contents of the lookup table(s) may be maintained by a combination of write-buffering and an indirection layer (e.g., logic 41b) and the RAID/EC controller 41. The lookup table(s) spans the entire set of SSDs and may be used to perform smaller-granularity lookups and writes.

In some embodiments, the write path works by batching together all incoming writes into full stripe writes and buffering the incoming writes into the persistent memory 43 to guarantee persistence. The buffered stripes are then written to the storage volume sequentially. If the stripes on the volume 42 are numbered, for example, the stripes may be written from stripe 0 to stripe N. As the writes occur, the lookup table(s) is/are updated in the persistent memory 43 such that future read operations can find the written data.

Eventually, the final set of stripes on the volume 42 will be written and the volume 42 may become out of space. To deal with this, the controller 41 may internally perform garbage collection by reading old stripes, looking up whether the blocks are still valid in the logical to physical translation table in the persistent memory 43, and rewriting the remaining valid data to the currently active stripe.

Embodiments of the system 40 may advantageously make substantially all I/O performed to the SSDs entirely sequential, large I/O. Embodiments advantageously provide excellent write performance for NAND technologies such as QLC, and also provide cost savings from the reduction in SSD RAM use. Performing bulk garbage collection does introduce some amount of write amplification (WA), but this WA is offset by a reduction in the internal WA that would have occurred internally in the SSDs if the RAID/EC volume had been written to randomly. Further, because data can be trimmed from the device in large units as stripes are released, real-world write amplification may be expected to drop for nearly all workloads.

A partial-stripe-write sequence of a traditional RAID5 volume may consist of the following steps:
1. Issue two reads (read old data and old parity) to calculate partial parity by XORing the two reads together;
2. Write partial parity to the parity drive (to close the RAID 5 write hole, i.e., to create a journal to recover from power failure/crash followed by a drive failure or vice versa);
3. XOR the partial parity with new data; and
4. Issue two writes (write new data and write new parity).

By way of comparison, and to illustrate the performance benefits of full stripe writes on RAID5 provided by some embodiments, the system 40 advantageously eliminates the foregoing steps 1 and 2. By having a full L2P in a file translation layer (FTL) above the RAID5, some embodiments may guarantee full-stripe writes to the RAID5 layer. Some embodiments may include logic configured to XOR the partial parity with new data (e.g., similar to step 3 above). But step 4 in traditional RAID5 writes parity one per stripe (sub-stripe) update. By performing full-stripe writes, some embodiments advantageously write parity once, instead of writing it multiple times, one per (sub)stripe update. By keeping full stripes buffered in the persistent memory 43 until new data and associated parity writes have persisted on RAID5, some embodiments eliminate the need for step 2. To quantify some of these benefits, some embodiments may achieve up to a two times (2x) endurance benefit, because traditional RAID5 in performing the partial-stripe-update sequence must write partial parity and parity multiple times versus only writing parity once for full stripe writes in accordance with some embodiments. Some embodiments may also provide about a 2x performance benefit as a result of eliminating partial parity writes, additional parity writes, and reads.

Some embodiments may further provide one or more of the following opportunistic benefits more easily, depending on the workload characteristics:

1. Latency of writes (e.g., also tail latency of writes or write quality of service (QoS)) may be low, due to buffering in the persistent memory;
2. Global wear leveling with larger NAND pool of drives may extend the useful life of NAND tier;
3. Deferred XOR or buffer+volume or EC operations from a critical RAID write path to a non-critical flush path (e.g., and potentially flush during idle periods);
4. Absorbing short lifetime writes on the persistent memory write buffer in the FTL layer (e.g., eliminating a percentage of locality writes from ever going to the underlying RAID thus saving program erase cycles on NAND pool); and/or
5. Shaping writes in the persistent memory buffer according to death time (e.g., or lifetime correlation) to reduce host FTL WA factor (WAF) significantly (e.g., with a 2-level L2P and with write-shaping, some embodiments may reduce the net WAF to about one (1)).

Note that depending on the availability and durability requirements, the L2P and persistent write buffer stored in persistent memory and/or the SSDs may require storing additional copies to avoid single points of failure and preserving the fault tolerance provided by the underlying RAID at the system level.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)). Although embodiments of a data scrambler have been described in connection with persistent memory technology, those skilled in the art will appreciate that embodiments of other data scramblers may be readily adapted to other technologies, such as telecommunication, with suitable modifications corresponding to constraints relevant to such technologies.

Figure 5:
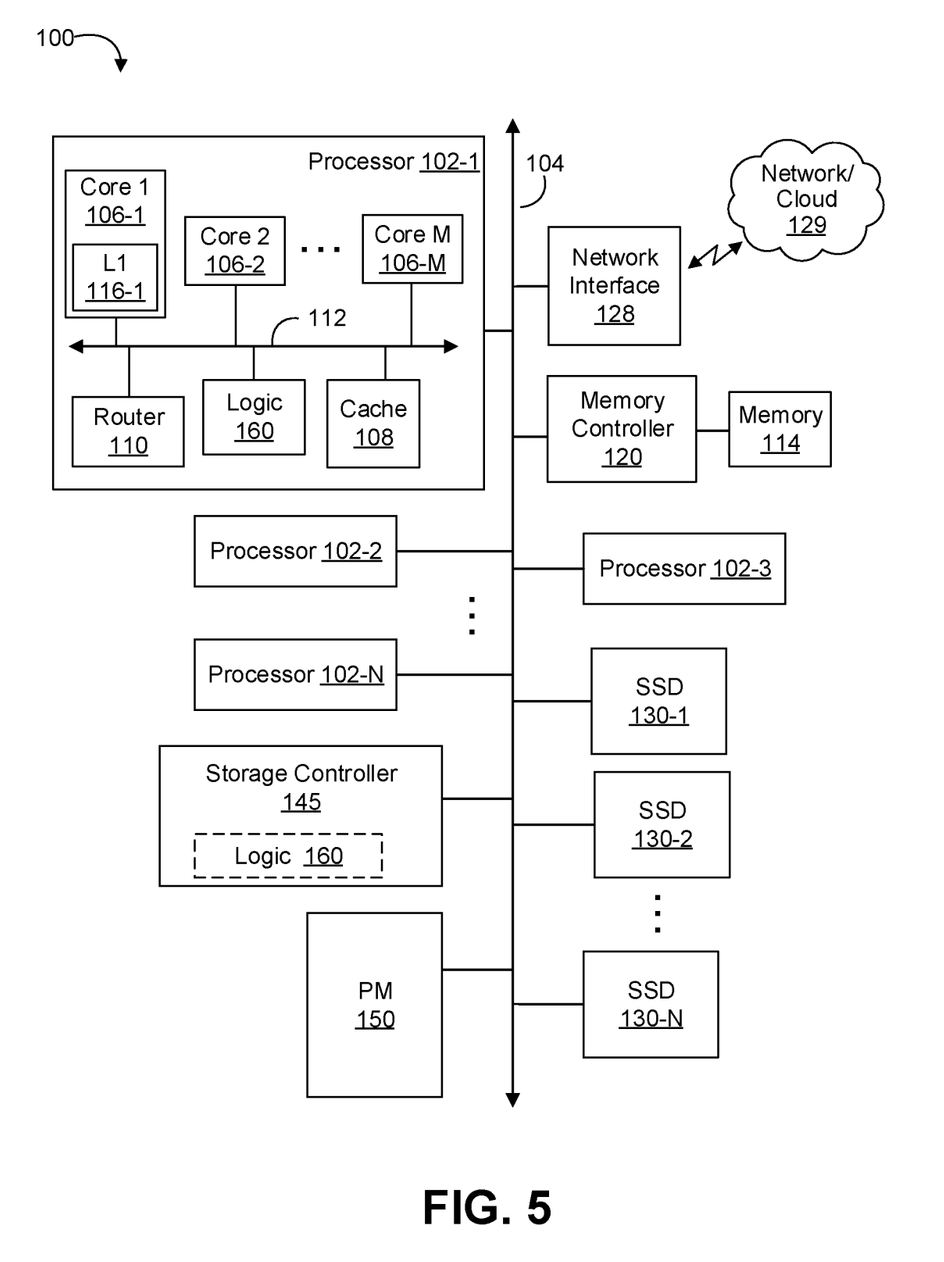
FIG. 5 is a block diagram of an example of a computing system according to an embodiment.

Turning now to FIG. 5, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 160, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 5, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 5, memory 114 may be coupled to other components of system 100 through a memory controller 120. Memory 114 may include volatile memory and may be interchangeably referred to as main memory or system memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include multiple storage devices such as SSD 130-1 through 130-N (collectively SSDs 130) coupled to the interconnect 104 (e.g., via internal SSD controller logic). Even though SSDs 130 are shown to be directly coupled to the interconnection 104 in FIG. 5, they can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc.) Additionally, controller logic for the SSDs 130 may be provided on a same integrated circuit (IC) device as other components of the SSDs 130 in various embodiments (e.g., or on a same circuit board device as the SSDs 130 or in the same enclosure as the SSDs 130).

Furthermore, SSDs 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, SSD 130, SSD bus, SATA bus, logic 160, etc., to sense variations in various factors affecting power/thermal behavior of the system/platform, such as temperature, operating frequency, operating voltage, power consumption, and/or inter-core communication activity, etc.

System 100 may also include a persistent memory (PM) device (e.g., an OPTANE DIMM device) such as a PM 150 coupled to the interconnect 104 via PM controller logic.

Even though PM 150 is shown to be directly coupled to the interconnection 104 in FIG. 5, PM 150 can alternatively communicate via a memory bus/interconnect (such as a DDR4 interface, etc.) with one or more other components of system 100 (for example where the memory bus is coupled to interconnect 104 via some other logic like a bus bridge, chipset, etc.) Additionally, controller logic for the PM 150 may be provided on a same integrated circuit (IC) device with other components of the PM 150 in various embodiments (e.g., or on the same circuit board device as the PM 150 or in the same enclosure as the PM 150).

Furthermore, PM 150 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, PM 150, memory bus, logic 160, etc., to sense variations in various factors affecting power/thermal behavior of the system/platform, such as temperature, operating frequency, operating voltage, power consumption, and/or inter-core communication activity, etc. The PM 150 is a separate component outside of the SSDs 130 (e.g., which may include NVRAM or other persistent memory within their respective housings). In most implementations, the PM 150 is not located on a common substrate or circuit board with the NAND media of the SSDs and is outside of any housing or enclosure of the SSDs 130 (e.g., although the PM 150 may be in the same rack enclosure or datacenter facility with the SSDs 130).

As illustrated in FIG. 5, the system 100 includes a storage controller 145 with logic 160 configured to provide one or more of the features/aspects/operations discussed with reference to FIGS. 1-4. Alternatively, one or more of the features/aspects/operations discussed with reference to FIGS. 1-4 may be performed by one or more of the other components of FIG. 5. For example, one or more of the processors 102 may include logic 160. Also, one or more of the features/aspects/operations of FIGS. 1-4 may be programmed into firmware. Advantageously, the logic 160 and/or firmware may include technology to implement one or more aspects of the system 10 (FIG. 1), the apparatus 15 (FIG. 2), the method 20 (FIGS. 3A to 3C), the system 40 (FIG. 4), and/or any of the features discussed herein. As shown in FIG. 5, features or aspects of the logic 160 may be distributed throughout the system 100, and/or co-located/integrated with various components of the system 100.

In particular, the logic 160 may be configured to maintain a respective lookup table for each of the SSDs 130 in the PM 150 with a first indirection granularity (e.g., 4 KB) that is smaller than a second indirection granularity (e.g., 64 KB, 128 KB, etc.) of each of the SSDs 130, buffer write requests to the SSDs 130 in the PM 150 in accordance with the respective lookup tables, and perform a sequential write from the PM 150 to a particular device of the SSDs 130 when a portion of the buffer that corresponds to the particular device has an amount of data to write that corresponds to the second indirection granularity. For example, the logic 160 may be configured to share the PM 150 among the SSDs 130. In some embodiments, the logic 160 may be configured to provide a block interface to the SSDs 130.

In some embodiments, the logic 160 may be further to configure the SSDs 130 as a data protection volume with a stripe size that is the same as the second indirection granularity, and buffer the write requests to the SSDs 130 in the PM 150 into full stripe writes in accordance with the respective lookup tables. For example, the logic 160 may be further configured to sequentially write full stripes from the persistent memory to the data protection volume. The logic 160 may also be configured to log the write requests in the persistent memory to close a write hole for the data protection volume. In some embodiments, the second indirection granularity may be an integer multiple (e.g., 16×, 32×, etc.) of the first indirection granularity. In some embodiments, the data protection volume may comprise one of an EC volume and a RAID volume.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
one or more substrates; and
integrated circuitry coupled to the one or more substrates, the integrated circuitry to:
maintain first translation tables each for a respective one of two or more persistent storage devices, wherein the first translation tables are to be maintained in a persistent memory which is outside of the two or more persistent storage devices, wherein the two or more persistent storage devices are each to comprise a different respective one of second translation tables, wherein the two or more persistent storage devices are each to comprise respective indirection circuitry to translate a respective logical block address (LBA) to a respective physical address, and wherein a first indirection granularity of each of the first translation tables is to be smaller than a second indirection granularity of each of the second translation tables,
buffer write requests in the persistent memory in accordance with the first translation tables, wherein the write requests are each to target a respective one of the two or more persistent storage devices, and
perform a sequential write from the persistent memory to a particular device of the two or more persistent storage devices when a portion of a buffer that corresponds to the particular device has an amount of data to write that corresponds to the second indirection granularity.

2. The electronic apparatus of claim 1, wherein the integrated circuitry is further to:
configure the two or more persistent storage devices as a data protection volume with a stripe size that is the same as the second indirection granularity; and
buffer the write requests into full stripe writes in accordance with the first translation tables.

3. The electronic apparatus of claim 2, wherein the integrated circuitry is further to:
sequentially write full stripes from the persistent memory to the data protection volume.

4. The electronic apparatus of claim 2, wherein the integrated circuitry is further to:
log the write requests in the persistent memory to close a write hole for the data protection volume.

5. The electronic apparatus of claim 2, wherein the second indirection granularity is an integer multiple of the first indirection granularity.

6. The electronic apparatus of claim 2, wherein the data protection volume comprises one of an erasure coding volume and a redundant array of independent disks volume.

7. The electronic apparatus of claim 1, wherein the persistent memory comprises three dimensional crosspoint memory and wherein one or more of the two or more persistent storage devices comprises a NAND-based solid state drive.

8. An electronic system, comprising:
two or more persistent storage devices;
persistent memory outside of the two or more persistent storage devices; and
a controller communicatively coupled to the persistent memory and the two or more persistent storage devices, the controller including integrated circuitry to:
maintain first translation tables each for a respective one of the two or more persistent storage devices, wherein the first translation tables are to be maintained in the persistent memory, wherein the two or more persistent storage devices are each to comprise a different respective one of second translation tables, wherein the two or more persistent storage devices are each to comprise respective indirection circuitry to translate a respective logical block address (LBA) to a respective physical address, and wherein a first indirection granularity of each of the first translation tables is to be smaller than a second indirection granularity of each of the second translation tables,
buffer write requests in the persistent memory in accordance with the first translation tables, wherein the write requests are each to target a respective one of the two or more persistent storage devices, and
perform a sequential write from the persistent memory to a particular device of the two or more persistent storage devices when a portion of a buffer that corresponds to the particular device has an amount of data to write that corresponds to the second indirection granularity.

9. The electronic system of claim 8, wherein the integrated circuitry is further to:
configure the two or more persistent storage devices as a data protection volume with a stripe size that is the same as the second indirection granularity; and
buffer the write requests into full stripe writes in accordance with the first translation tables.

10. The electronic system of claim 9, wherein the integrated circuitry is further to:
sequentially write full stripes from the persistent memory to the data protection volume.

11. The electronic system of claim 9, wherein the integrated circuitry is further to:
log the write requests in the persistent memory to close a write hole for the data protection volume.

12. The electronic system of claim 9, wherein the second indirection granularity is an integer multiple of the first indirection granularity.

13. The electronic system of claim 9, wherein the data protection volume comprises one of an erasure coding volume and a redundant array of independent disks volume.

14. The electronic system of claim 8, wherein the persistent memory comprises three dimensional crosspoint memory and wherein one or more of the two or more persistent storage devices comprises a NAND-based solid state drive.

15. A method of controlling storage, comprising:
maintaining first translation tables each for a respective one of two or more persistent storage devices, wherein the first translation tables are maintained in a persistent memory which is outside of the two or more persistent storage devices, wherein the two or more persistent storage devices each comprise a different respective one of second translation tables, wherein the two or more persistent storage devices each comprise respective indirection circuitry to translate a respective logical block address (LBA) to a respective physical address, and wherein a first indirection granularity of each of the first translation tables is smaller than a second indirection granularity of each of the second translation tables;
buffering write requests in the persistent memory in accordance with the first translation tables, wherein the write requests are each to target a respective one of the two or more persistent storage devices; and
performing a sequential write from the persistent memory to a particular device of the two or more persistent storage devices when a portion of a buffer that corresponds to the particular device has an amount of data to write that corresponds to the second indirection granularity.

16. The method of claim 15, further comprising:
configuring the two or more persistent storage devices as a data protection volume with a stripe size that is the same as the second indirection granularity; and
buffering the write requests in the persistent memory into full stripe writes in accordance with the first translation tables.

17. The method of claim 16, further comprising:
sequentially writing full stripes from the persistent memory to the data protection volume.

18. The method of claim 16, further comprising:
logging the write requests in the persistent memory to close a write hole for the data protection volume.

19. The method of claim 16, wherein the second indirection granularity is an integer multiple of the first indirection granularity.

20. The method of claim 16, wherein the data protection volume comprises one of an erasure coding volume and a redundant array of independent disks volume.

* * * * *